United States Patent
Kochi et al.

(10) Patent No.: US 7,135,668 B2
(45) Date of Patent: Nov. 14, 2006

(54) SOLID-STATE IMAGING APPARATUS COMPRISING REFERENCE ELECTRIC POWER SOURCE HAVING THE SAME CIRCUIT STRUCTURE AS THAT OF SIGNAL AMPLIFICATION MEANS FOR AMPLIFYING A SIGNAL FROM PHOTOELECTRIC CONVERSION ELEMENT

(75) Inventors: Tetsunobu Kochi, Kanagawa (JP); Koji Sawada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 10/887,816

(22) Filed: Jul. 12, 2004

(65) Prior Publication Data
US 2005/0035271 A1    Feb. 17, 2005

(30) Foreign Application Priority Data
Jul. 16, 2003    (JP) .............................. 2003-275423

(51) Int. Cl.
H01J 40/14    (2006.01)
(52) U.S. Cl. ............................... 250/214 R; 250/208.1
(58) Field of Classification Search ............. 250/208.1, 250/214 R
See application file for complete search history.

(56) References Cited

U.S. PATENT DOCUMENTS

| 6,169,317 | B1 | 1/2001 | Sawada et al. | 257/435 |
| 6,188,094 | B1 | 2/2001 | Kochi et al. | 257/232 |
| 6,303,951 | B1 | 10/2001 | Sawada et al. | 257/292 |
| 6,605,850 | B1 | 8/2003 | Kochi et al. | 257/431 |
| 6,670,990 | B1 | 12/2003 | Kochi et al. | 348/310 |
| 6,717,151 | B1 | 4/2004 | Tashiro et al. | 250/370.11 |
| 6,960,754 | B1 * | 11/2005 | Sakaguchi | 250/214 A |
| 2001/0012133 | A1 | 8/2001 | Yoneda et al. | 358/482 |
| 2002/0021786 | A1 | 2/2002 | Hamamoto et al. | 378/189 |

FOREIGN PATENT DOCUMENTS

JP    2002-330258 A    11/2002

* cited by examiner

Primary Examiner—Que T. Le
(74) Attorney, Agent, or Firm—Fitzpatrick, Cella, Harper & Scinto

(57) ABSTRACT

A solid-state imaging device includes a plurality of pixels each including a photoelectric conversion element and a signal amplification element which receives a signal from the photoelectric conversion element to amplify and output the signal, a signal amplifier including a first input terminal which receives the signal from the signal amplification element and a second input terminal into which a reference voltage is input, and a reference electric power supply, which supplies the reference voltage to the second input terminal of the signal amplifier, the reference electric power supply including a circuit configuration equivalent to the signal amplification element.

16 Claims, 14 Drawing Sheets

SOLID-STATE IMAGING APPARATUS COMPRISING REFERENCE ELECTRIC POWER SOURCE HAVING THE SAME CIRCUIT STRUCTURE AS THAT OF SIGNAL AMPLIFICATION MEANS FOR AMPLIFYING A SIGNAL FROM PHOTOELECTRIC CONVERSION ELEMENT

This application claims priority from Japanese Patent Application No. 2003-275423 filed on Jul. 16, 2003, which is hereby incorporated by reference.

BACKGROUND OF THE INVENTION

1. Field of the Invention

The present invention relates to a solid-state imaging device and a method of driving the device, particularly to an amplifier type solid-state imaging device in which a source follower amplifier is disposed in a pixel section, and a method of driving the device of that type.

2. Related Background Art

FIG. 13 is a schematic diagram of a conventional solid-state imaging device, and specifically, a linear sensor including four pixels is illustrated. Reference numeral 1 (1-1 to 1-4) denotes photoelectric conversion elements such as photodiodes, 2 (2-1 to 2-4) denotes reset MOS transistors, 3 (3-1 to 3-4) denotes input MOS transistors of source followers, and 4 (4-1 to 4-4) denotes constant current sources of the source follower. The input MOS transistors 3 (3-1 to 3-4) and the constant current sources 4 (4-1 to 4-4) of the source followers are combined to form source follower amplifiers 5 (5-1 to 5-4). In FIG. 13, the source follower amplifiers using PMOS is illustrated as an example. Reference numeral 6 (6-1 to 6-4) denotes first signal transfer transistors, 7 (7-1 to 7-4) denotes holding capacitors (capacitance is hereinafter referred to as Ct), 8 denotes a scanning circuit, 9 (9-1 to 9-4) denotes second signal transfer transistors driven by a signal from the scanning circuit, 10 denotes a common output line connected in common to one end of each of the second signal transfer transistors 9, and 11 denotes an operation amplifier which forms an output amplifier. The common output line 10 is connected to one of input terminals of the operation amplifier 11. Reference numeral 12 denotes a reference voltage source connected to another input terminal of the operation amplifier 11, 13 denotes a feedback capacitor of the amplifier (capacity value is hereinafter referred to as Cf), and 14 denotes a switch for bringing the operation amplifier 11 into a buffer state. Reference numeral 15 denotes a reset power supply for resetting one end of the photoelectric conversion element 1 via the reset MOS transistor 2. Reference numeral 16 denotes an output terminal of the operation amplifier 11. An example of the solid-state imaging device having this circuit constitution is described, for example, in Japanese Patent Application No. 2002-330258 or the like.

FIG. 14 shows an operation timing chart showing an operation of the above-described circuit. The operation of the present circuit will be briefly described with reference to the drawing.

In FIG. 14, PRES denotes a reset pulse which is input into a gate of the reset MOS transistor 2, PT denotes a transfer pulse to be input into a gate of the first signal transfer transistor 6, PSR1 to PSR4 denote scanning pulses successively output from the scanning circuit 8 to drive the second signal transfer transistor 9, and PRES2 denotes a pulse to be input into the switch 14.

First, the reset MOS transistor 2 is turned on by the reset pulse PRES to reset the photoelectric conversion element 1 to a voltage determined by the reset power supply 15. After turning off the reset MOS transistor 2, the photoelectric conversion element 1 enters an accumulation operation of a light signal to produce a signal charge in accordance with a quantity of incident light. The produced signal charge is converted to a signal voltage by a capacitance which exists in a portion (not shown) connected to the photoelectric conversion element 1 and the input MOS transistor 3. The capacitance generally corresponds to a junction capacitance of the photodiode, a drain junction capacitance of the reset MOS transistor, a gate capacitance of the input MOS transistor, a capacitance between wirings or the like. However, a capacitor element may be sometimes intentionally added. After elapse of an accumulation time, the signal voltage is amplified by the source follower amplifier 5, and the amplified signal is read out into the holding capacitor 7 by turning on the first signal transfer transistor 6 by PT. It is here assumed that the signal voltage read out into the holding capacitor 7 is Vct. Next, PRES2 is turned on. When this pulse is turned on, the operation amplifier 11 functions as a buffer amplifier, and the common output line 10 is reset to a voltage determined by the reference voltage source 12. Here, the voltage is assumed as Vref1. Next, when the second signal transfer transistor 9-1 is turned on by the scanning pulse PSR1, the signal stored in the holding capacitor 7-1 is read out into the common output line 10. A voltage represented by the following equation appears at an output end of the operation amplifier 11 in accordance with the read signal.

$$Vout = -(Ct/Cf) \cdot (Vct - Vref1) + Vref1,$$

where Vout denotes an output terminal voltage of the operation amplifier 11 in a period during which the scanning pulse PSR1 is turned on.

Subsequently, as shown in FIG. 14, the scanning pulses PSR2 to PSR4 and PRES2 are successively turned on to continuously read the signals of the four-pixel linear sensor. In this circuit constitution, since a gain is determined by a capacitance ratio of the feedback capacitor 13 of an amplifier section to the signal holding capacitor 7, the scanning circuit 8 may be driven so that, for example, the signals are simultaneously read from two holding capacitors, thereby attaining double gain.

A relation between the input voltage and the output voltage of the operation amplifier 11 is schematically shown in FIG. 15. Assuming that the ordinate indicates an input voltage (Vct) or an output voltage (Vout) of the operation amplifier, and the abscissa indicates values of the capacitances Ct and Cf, as shown, Vout obtained with respect to certain Vct can be schematically represented by a seesaw using Vref1 as a supporting point. A ratio of length of the seesaw corresponds to a ratio of Ct to Cf. To facilitate description, it is assumed in FIG. 15 that Vct=Vref1, when the sensor is in a dark state. At this time, in the photoelectric conversion element of FIG. 13 in which an anode is connected to the input terminal of the source follower, a terminal voltage of the photodiode rises toward a power supply side from a ground side in accordance with the quantity of received light. As a result, the signal read onto the holding capacitor Ct indicates a voltage higher than the voltage (Vref1) in the dark state. As a result, the output of the amplifier has a voltage Vref1 in the dark state, and has a voltage lower than Vref1, when the light is received (e.g., Japanese Patent Application Laid-Open No. 2002-330258).

In the source follower circuit 5 shown in FIG. 13, the gate of the input MOS transistor 3 constitutes the input terminal, and the source constitutes the output terminal. An offset voltage determined by a threshold voltage, mobility, gate length, gate width or the like of the input MOS transistor 3 is produced between the input terminal voltage and the output terminal voltage. The threshold voltage, mobility, gate length, and gate width of the MOS transistor change depending on condition variation of a manufacturing process, and therefore the offset voltage inevitably varies by the variation of the manufacturing process. When the offset voltage changes from an initially-set value, the voltage on the holding capacitor 7 also deviates from the set value. This is shown in a schematic diagram of FIG. 16. To facilitate the description, in FIG. 16, the capacitance ratio and voltage are assumed as follows.

Capacitance ratio (Ct/Cf)=1.5
Voltage at dark time (before variation)=1 V
Reference voltage=1 V
Considering the above-described conditions, $$V\text{out} = -1.5 \times (1-1) + 1 = 1\ V,$$

but in case that the voltage on the holding capacitor Ct deviates from 1 V to 1.2 V, $$V\text{out} = -1.5 \times (1.2-1) + 1 = 0.7\ V.$$

A variation of −0.3 V is caused in an amplifier output. Supposing that the voltage on Ct at a light irradiation time is 1.6 V, then Vout=0.1 V. However, assuming that the voltage at the dark time shifts by 0.2 V as described above, the voltage on Ct at the light irradiation time also shifts to 1.8 V in parallel. Eventually, Vout<0 V is provided. Therefore, a rate is limited to a ground voltage or an output-possible lower limit value of an amplifier output, and thus a normal output is not obtained. As a result, there occurs a problem that a saturation voltage drops or that linearity of the signal is impaired. When the voltage on Ct shifts on a ground side, the voltage at the dark time is Vout, the rate is limited to a power voltage or an output-possible upper limit value of the amplifier output. This similarly results in that the normal output is not obtained, so that there occurs a problem that the signal linearity is impaired.

SUMMARY OF THE INVENTION

An object of the present invention is to obtain a high-quality image.

To achieve the object, according to an aspect of the present invention, a solid-state imaging device of the present invention comprising: a plurality of pixels each including a photoelectric conversion element and a signal amplification element which receives a signal from the photoelectric conversion element to amplify and output the signal; a signal amplifier including a first input terminal which receives the signal from the signal amplification element and a second input terminal into which a reference voltage is input; and a reference electric power supply, which supplies the reference voltage to the second input terminal of the signal amplifier, wherein the reference electric power supply includes a circuit configuration equivalent to the signal amplification element.

In accordance with another aspect of the present invention, a solid-state imaging device of the present invention comprising: a plurality of pixels each including a photoelectric conversion element and a first source follower amplifier whose input terminal is connected to one end of the photoelectric conversion element; a signal amplifier including an input terminal which receives the signal from the first source follower amplifier and a second input terminal into which a reference voltage is input; and a reference electric power supply, which supplies the reference voltage to the second input terminal of the signal amplifier, wherein the first source follower amplifier includes a conductive type input transistor and a load element, and the reference electric power supply includes a second source follower amplifier including an input transistor of the same conductive type as that of the first source follower amplifier and a load element.

According to still another aspect, a solid-state imaging device of the present invention comprising: a photoelectric conversion element; a first source follower amplifier whose input terminal is connected to one end of the photoelectric conversion element; a first holding capacitor, which receives a signal output from the first source follower amplifier via a first transfer transistor; a second source follower amplifier whose input terminal is connected to the first holding capacitor; a second holding capacitor, which receives a signal output from the second source follower amplifier via a second transfer transistor; a third holding capacitor, which receives a signal output from the second source follower amplifier via a third transfer transistor; a first signal amplifier including a first input terminal which receives the signal held by the second holding capacitor and a second input terminal into which a reference voltage is input; a second signal amplifier including a third input terminal which receives the signal held by the third holding capacitor and a fourth input terminal into which a reference voltage is input; and a reference electric power supply connected to the second and fourth input terminals of the first and second signal amplifiers, wherein at least one of the first and second source follower amplifiers includes a conductive type input transistor and a load element, the reference electric power supply includes a third source follower amplifier including an input transistor of the same conductive type as that of at least one of the first and second source follower amplifiers and a load element.

Other objects and characteristics of the present invention will be apparent by the following specification and drawings.

DESCRIPTION OF THE PREFERRED EMBODIMENTS

Embodiments of the present invention will be described hereinafter in detail with reference to the drawings.

First Embodiment

Figure 1:
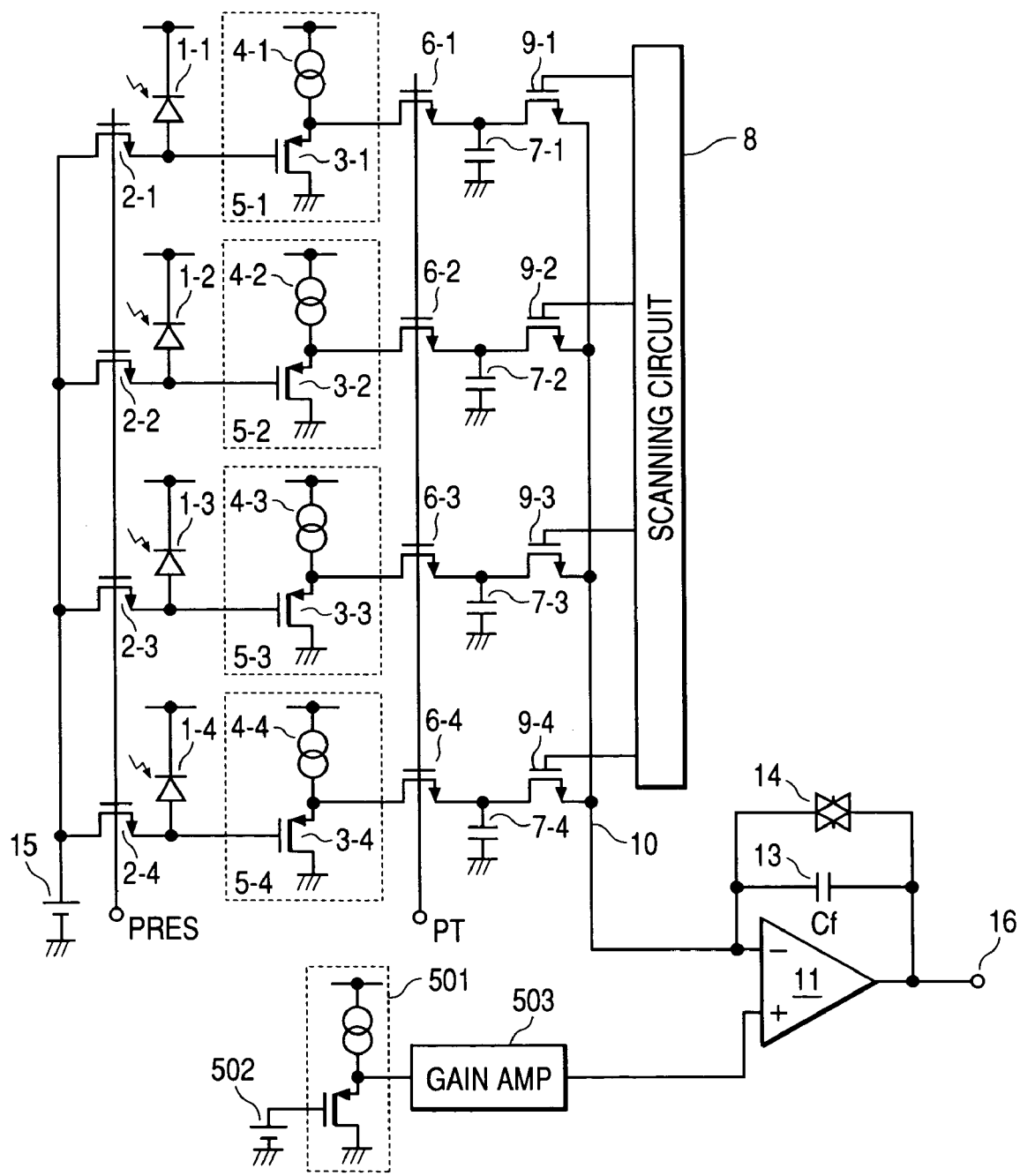
FIG. 1 is a circuit constitution diagram showing a solid-state imaging device according to a first embodiment of the present invention.
Figure 13:
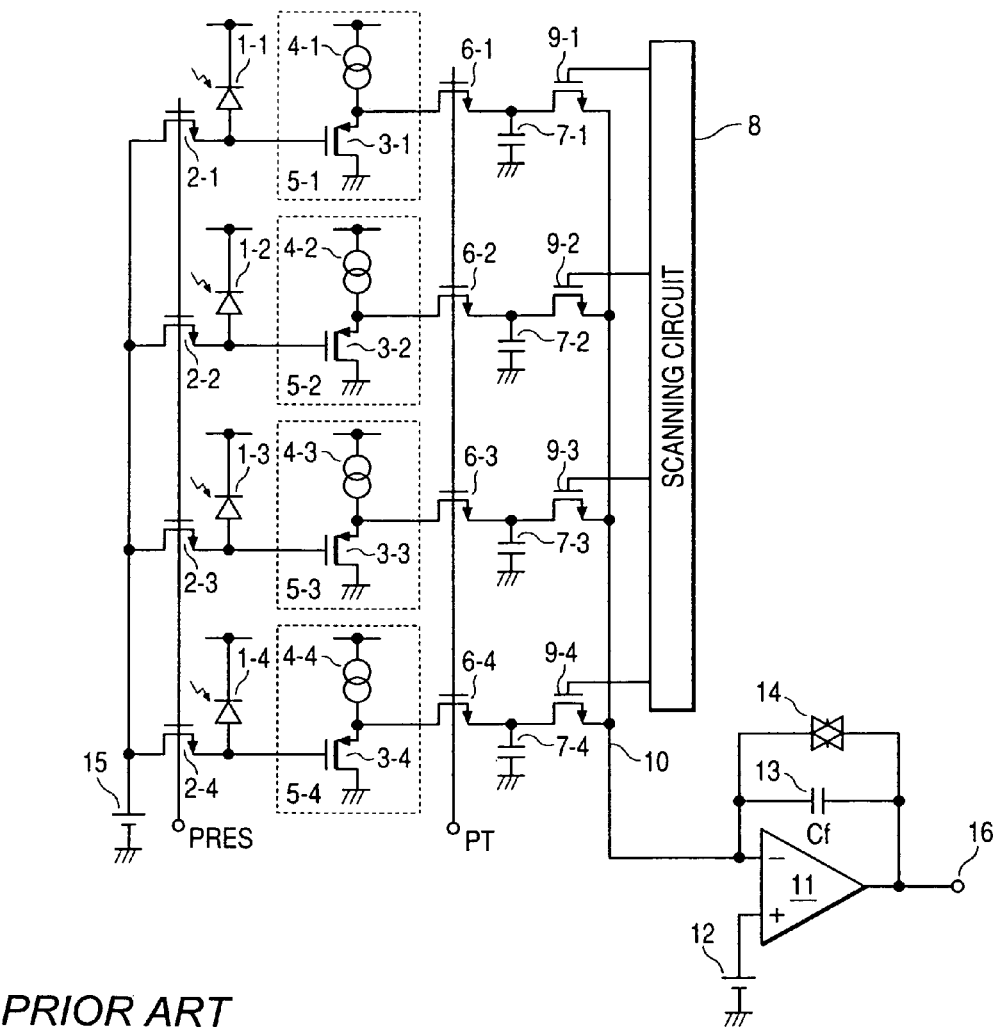
FIG. 13 is a diagram showing an example of a circuit of a conventional solid-state imaging device.
Figure 14:
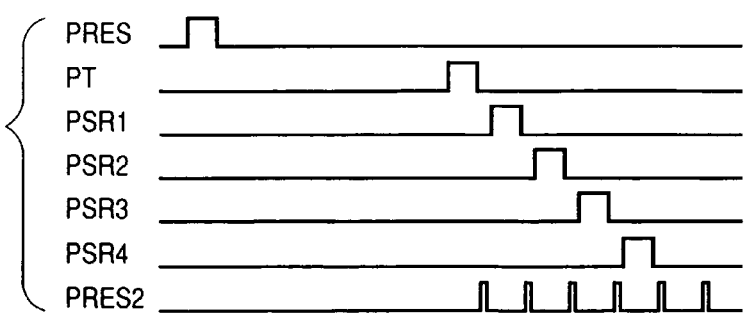
FIG. 14 is a timing chart of the solid-state imaging device of FIG. 13.
Figure 15:
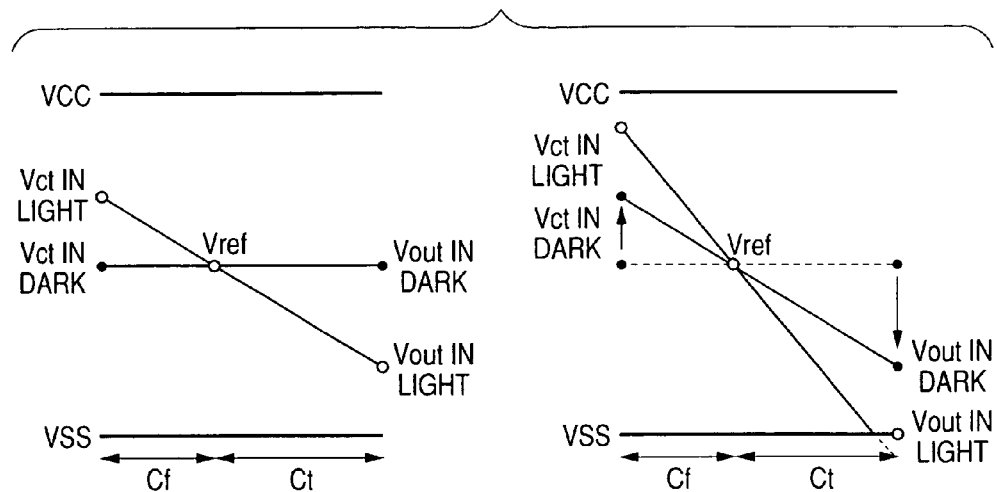
FIG. 15 is a schematic explanatory view showing an operation point of the conventional solid-state imaging device.
Figure 16:
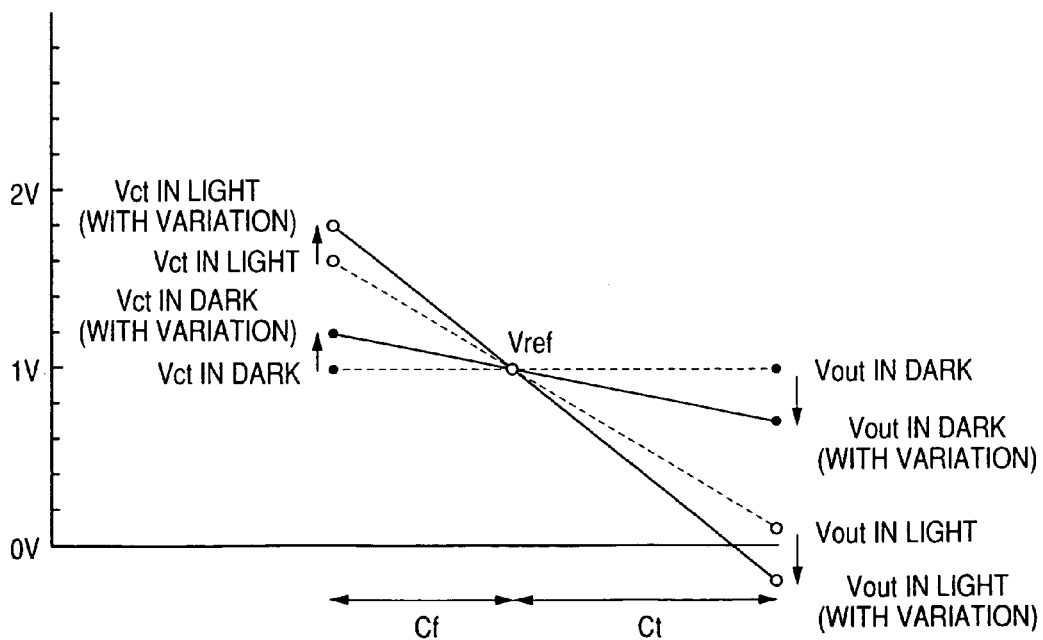
FIG. 16 is a schematic explanatory view showing problems of the conventional solid-state imaging device.

FIG. 1 is a schematic diagram showing a first embodiment of the present invention. The same members as those of FIG. 13 are denoted with the same reference numerals, and detailed description is omitted.

In FIG. 1, reference numeral 501 denotes a second source follower amplifier having the same constitution as that of a source follower amplifier 5, 502 denotes a second reference voltage source, and 503 denotes a gain amplifier. Instead of the reference voltage source 12 of FIG. 13, the second source follower amplifier 501, second reference voltage source 502, and gain amplifier 503 are disposed.

A total voltage of an offset voltage produced in the second source follower amplifier 501 and a voltage set by the second reference voltage source 502 is input into the input of the gain amplifier 503. A size or the like of the MOS transistor is adjusted so that the offset voltage produced by the second source follower amplifier 501 is substantially equal to that produced by the source follower circuit 5. For example, a MOS transistor having a gate length or width equal to that of the source follower circuit 5 is used, and the same current amount is supplied to the transistor to be driven, so that the above-described conditions can be achieved. Moreover, even in case that the gate length or width is different, the current amount to be supplied may be adjusted in accordance with that difference so that the second source follower circuit 501 having an offset voltage substantially equal to that of the source follower circuit 5 can be realized. The gain amplifier 503 has output characteristics represented by the following equation (1).

$$Vref1 = \frac{Ct/Cf}{1+Ct/Cf} \times (Vin - Vref2) + Vref2 = \frac{Ct}{Ct+Cf}Vin + \frac{Cf}{Ct+Cf}Vref2 \quad (1)$$

where Vin denotes an output voltage of the second source follower amplifier 501, that is, an input voltage of the gain amplifier 503. Vref1 denotes an output voltage of the gain amplifier 503, which is a reference voltage of an operation amplifier 11.

As described above, the offset voltage of the source follower circuit changes depending on variations of manufacturing process conditions, but in the present embodiment, the reference voltage of the operation amplifier 11 is also changed in accordance with the change amount of the offset voltage. Accordingly, a potential variation in an amplifier output is eliminated to prevent occurrence of the problems that a saturation voltage of a sensor drops and that linearity is impaired. The reference voltage of the operation amplifier 11 mentioned herein indicates a voltage of the terminal connected to the reference voltage source 12 of the conventional device.

When the above equation (1) is substituted for an equation representing input/output characteristics of the output amplifier described in connection with the conventional device, the following equation is obtained.

$$Vout = -\frac{Ct}{Cf}Vct + \frac{Ct+Cf}{Cf}\left(\frac{Ct}{Ct+Cf}Vin + \frac{Cf}{Ct+Cf}Vref2\right) = \quad (2)$$
$$-\frac{Ct}{Cf}(Vct - Vin) + Vref2$$

It is to be noted that gain Ga of the signal amplifier is $-Ct/Cf$ in the above equation (2). Therefore, $Ga/(Ga-1)=(Ct/Cf)/(1+Ct/Cf)$ is obtained, and this corresponds to the gain of the gain amplifier 503 in the above equation (1). This also applies to second to fourth embodiments described later.

As seen from the above equation, transistor sizes of the source follower circuits 5 and 501 are selected so that a change amount of Vct is substantially equal to that of Vin even in case of variation of a manufacturing process, thereby attaining constant Vout even in case that values of Vct and Vin vary.

Figure 2:
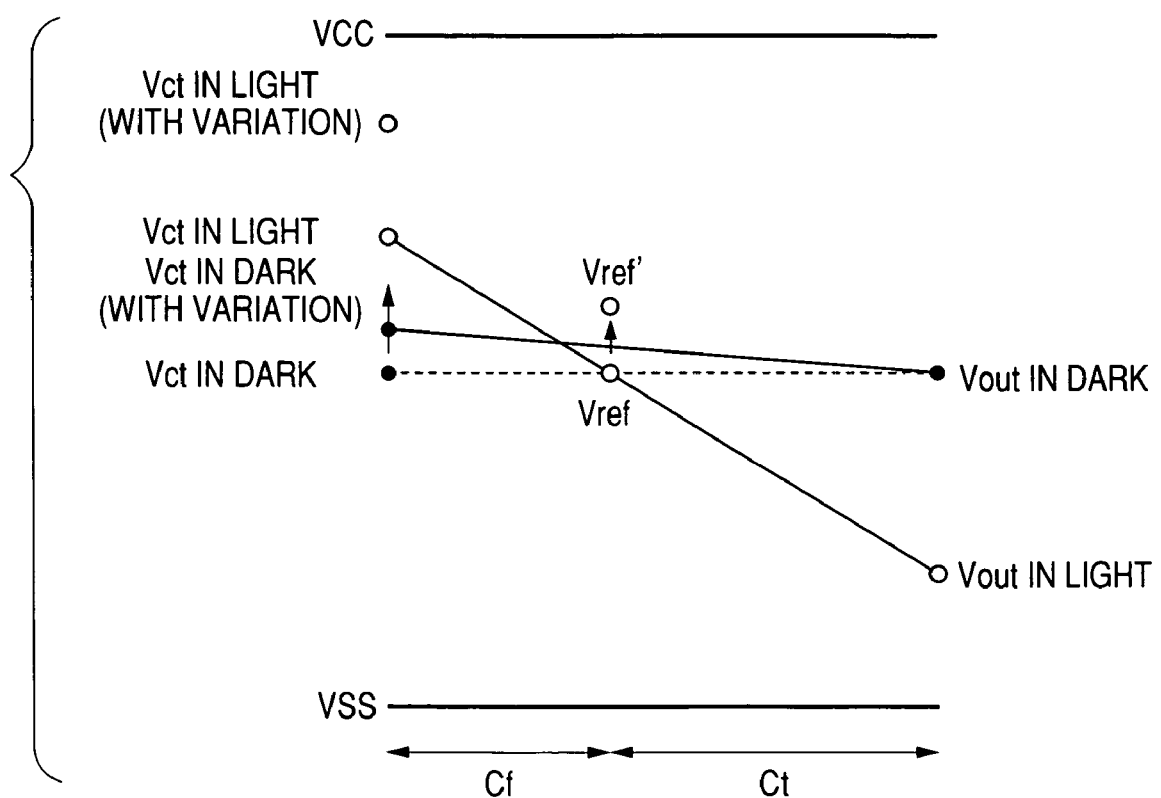
FIG. 2 is a schematic explanatory view showing an operation point of the solid-state imaging device according to the first embodiment of the present invention.

An operation of the present circuit will be described in more detail with reference to FIG. 2. To easily understand the description, a certain capacitance ratio and voltage are assumed as follows.

Capacitance ratio (Ct/Cf)=1.5

Voltage on holding capacitor Ct=1 V

Output voltage of second source follower 501=1 V

Vref=1 V

The voltage set by the second reference voltage source 502 is selected to obtain the above-described output voltage of the second source follower amplifier 501. At this time, from the above equation, the reference voltage of the operation amplifier 11 is as follows:

(1.5/(1+1.5))×(1−1)+1=1 V.

Here, when the offset voltage produced by the source follower 5 or the second source follower 501 changes by 0.2 V depending on the variation of the manufacturing process or the like, voltage on holding capacitor Ct=1.2 V; and input voltage of gain amplifier=1.2 V.

From the above equation, the following results:

(1.5/(1+1.5))×(1.2−1)+1=1.12 V.

Since this voltage is the reference voltage of the operation amplifier 11, the output voltage of the operation amplifier 11 is as follows:

$$Vout=-1.5\times(1.2-1.12)+1.12=1\ V.$$

In case that the gain of the amplifier for amplifying the signal is set to −Cf/Cf, the source follower circuit 501 indicating an offset voltage change substantially equal to that of the source follower circuit 5 for reading the signal is disposed as a voltage source, the change amount of the offset voltage is set to be (Ct/Cf)/(1+(Ct/Cf)) times in the amount to shift the reference voltage of the operation amplifier 11. Accordingly, even in case that the offset voltage of the source follower circuit changes depending on the manufacturing process, the output voltage variation of the operation amplifier 11 can be suppressed sufficiently. As a result, even in case that there is a variation in manufacturing process conditions, a solid-state imaging device having a stable saturation voltage and signal linearity can be realized.

Second Embodiment

Figure 3:
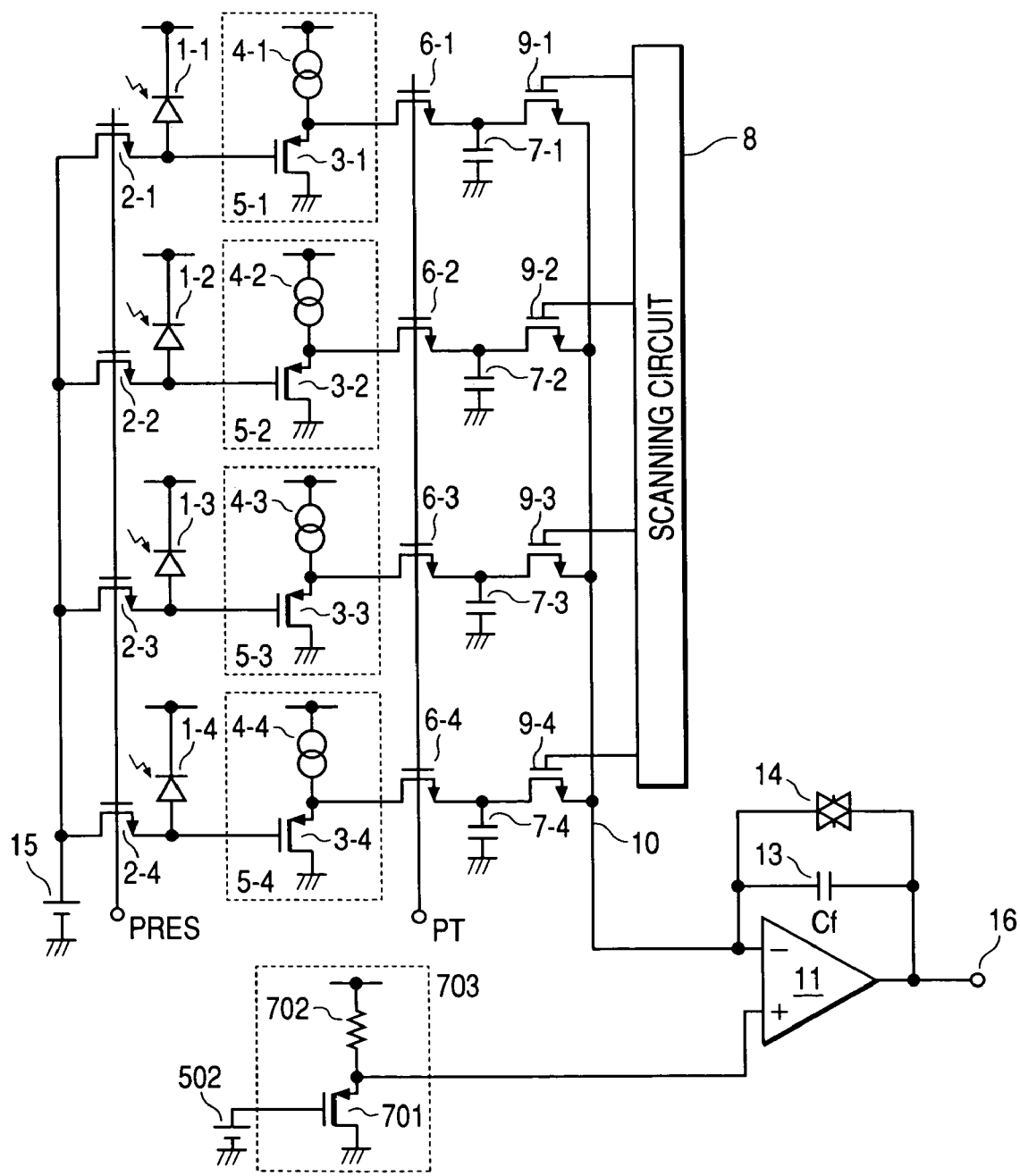
FIG. 3 is a circuit constitution diagram showing the solid-state imaging device according to a second embodiment of the present invention.

FIG. 3 is a schematic diagram showing a second embodiment of the present invention. The same members as those of FIGS. 13 and 1 are denoted with the same reference numerals. In FIG. 3, reference numeral 701 denotes an input MOS transistor of a source follower, and 702 denotes a resistance element. The input MOS transistor 701 and the resistance element 702 are combined to form a resistance load type source follower amplifier 703. Assuming that an ON-resistance value of the input MOS transistor 701 is Ron, and a resistance value of the resistance element 702 is R, the gain of the source follower amplifier 703 is:

$$R/(Ron+R).$$

In case that the size of the input MOS transistor 701 and the resistance value of the resistance element 702 are selected to satisfy the following equation:

$$R/(Ron+R)=(Ct/Cf)/(1+(Ct/Cf)),$$

an technological advantages similar to that of the first embodiment can be attained also in the present embodiment.

Since the similar advantages can be attained with less elements in the present embodiment as compared with the first embodiment, a solid-state imaging device having a smaller size and lower cost can be realized.

By the application of the present embodiment to a case where the source follower circuit 5 is a resistance load type source follower, as described above, the resistance load type source follower has a gain of 1 or less determined by a ratio of the ON-resistance of the MOS transistor to the resistance value of the resistance element. Therefore, assuming that the gain of the source follower circuit 5 is Gsf and the size of the input MOS transistor 701 and the resistance value of the resistance element 702 are selected to satisfy:

$$R/(Ron+R)=Gsf\times\{(Ct/Cf)/(1+(Ct/Cf))\},\ a$$

similar technological advantages can be attained.

Third Embodiment

Figure 4:
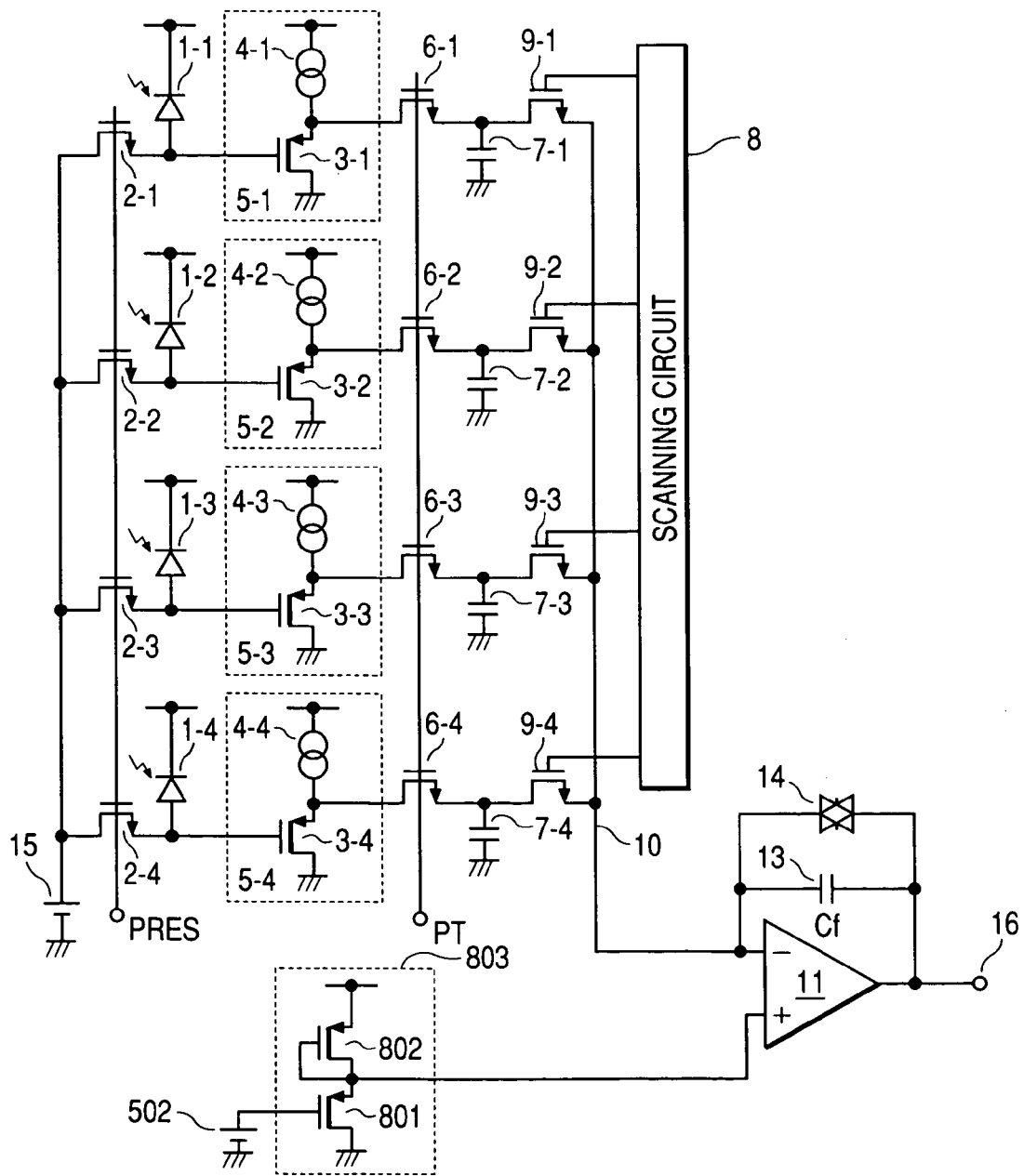
FIG. 4 is a circuit constitution diagram showing the solid-state imaging device according to a third embodiment of the present invention.

FIG. 4 is a schematic explanatory view showing a third embodiment of the present invention. The same members as those of FIGS. 13 and 1 are denoted with the same reference numerals. In FIG. 4, reference numeral 801 denotes an input MOS transistor of a source follower, and 802 denotes a load MOS transistor. The input MOS transistor 801 and the load MOS transistor 802 are combined to form a MOS-load type source follower amplifier 803. Assuming that an ON-resistance value of the input MOS transistor 801 is Ron1, and an ON-resistance value of the load MOS transistor 802 is Ron2, the gain of the source follower amplifier is:

$$Ron2/(Ron1+Ron2).$$

In case that the sizes of the input MOS transistor 801 and load MOS transistor 802 are selected to satisfy:

$$Ron2/(Ron1+Ron2)=Ct/(Ct/Cf),$$

technological advantages similar to that of the first embodiment can be attained. In general, since the resistance using the MOS transistor can realize the same resistance value with an occupying area smaller than that of a resistance element which uses a semiconductor diffusing layer, a smaller solid-state imaging device can be realized.

Fourth Embodiment

Figure 5:
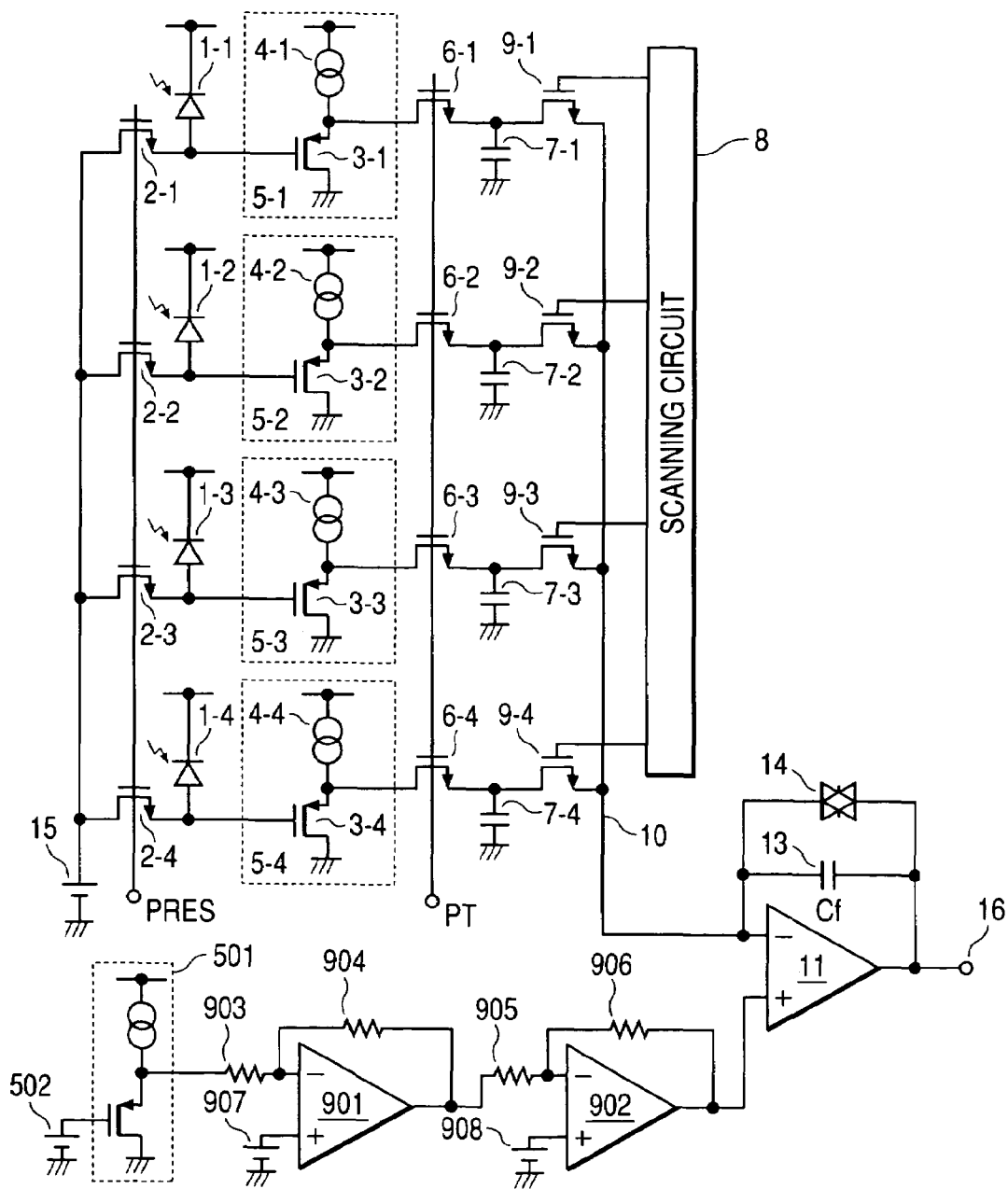
FIG. 5 is a circuit constitution diagram showing the solid-state imaging device according to a fourth embodiment of the present invention.

FIG. 5 is a schematic explanatory view showing a fourth embodiment of the present invention. The same members as those of FIGS. 13 and 1 are denoted with the same reference numerals. In FIG. 5, reference numerals 901, 902 denote second and third operation amplifiers, and 903 to 906 are resistance elements. The operation amplifier 901 and resistance elements 903, 904 constitute a first reverse amplifier. The operation amplifier 902 and resistance elements 905, 906 constitute a second reverse amplifier. Reference numeral 907 denotes a reference voltage source of the first reverse amplifier, and 908 denotes a reference voltage source of the second reverse amplifier. In the drawing, assuming that the resistance values of the resistance elements 903 to 906 are R1 to R4, the reference voltages of the reference voltage sources 907, 908 are Vref3, Vref4, the input of the first reverse amplifier is Vin, and the output of the second reverse amplifier is Vout, then input/output characteristics are represented by the following equation:

$$\begin{aligned}Vout &= -\frac{R4}{R3}\left\{-\frac{R2}{R1}(Vin-Vref2)+Vref2-Vref3\right\}+Vref3 \\ &= \frac{R2\cdot R4}{R1\cdot R3}Vin-\frac{R4}{R3}\frac{R1+R2}{R1}Vref2+\frac{R3+R4}{R3}Vref3\end{aligned} \quad (3)$$

In case that the value of the resistance element is selected so that the gain of the circuit satisfies:

$$(R2\cdot R4)/(R1\cdot R3)=(Ct/Cf)/(1+(Ct/Cf)),$$

the similar technological advantages are obtained.

In case that the reference voltage circuit is constituted using the operation amplifier as in the present embodiment, as seen from the above equation, the gain can be determined by not the reference voltage itself of the resistance element but a ratio of the resistance value. Therefore, even in case that the manufacturing process varies, so that an absolute value of the resistance value of the resistance element varies, the variation of the gain can be reduced/suppressed. Therefore, an original object is achieved, that is, the offset voltage variation of the source follower circuit section can be corrected with good precision.

Fifth Embodiment

Figure 6:
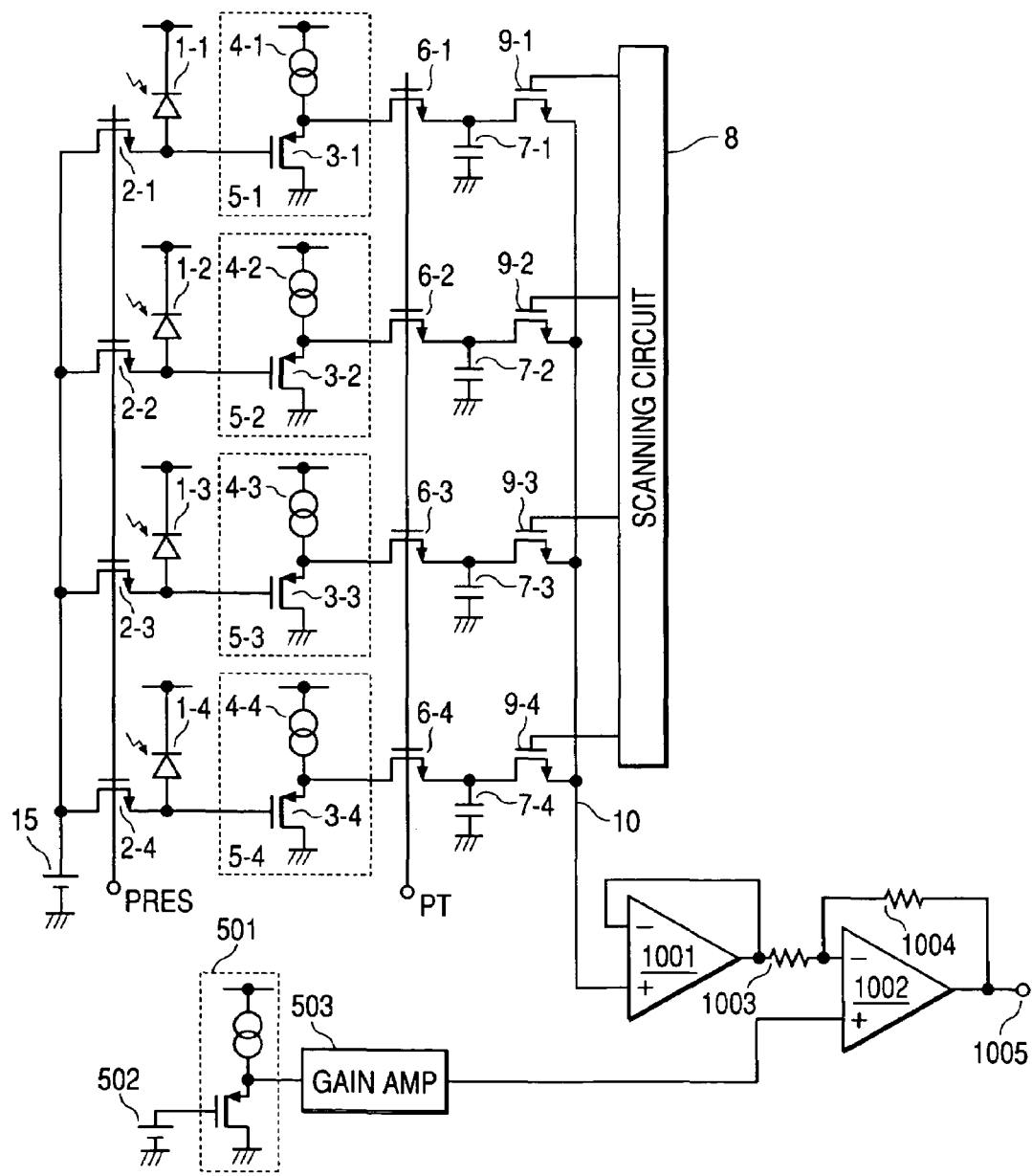
FIG. 6 is a circuit constitution diagram showing the solid-state imaging device according to a fifth embodiment of the present invention.

FIG. 6 is a schematic explanatory view showing a fifth embodiment of the present invention. The same members as those of FIGS. 13 and 1 are denoted with the same reference numeral. The present embodiment illustrates an example in which an output amplifier circuit for reading signals is constituted using an operation amplifier and a resistance element.

In the drawing, reference numeral 1001 denotes a first operation amplifier, 1002 denotes a second operation amplifier, and 1003, 1004 denote resistance elements. The first operation amplifier 1001 functions as a buffer circuit having a gain of one time, when an output terminal is connected to one end of an input terminal. The second operation amplifier 1002 constitutes a reverse amplifier, when the resistance element 1003 is connected between the first operation amplifier 1001 and the second operation amplifier 1002 (an output of a buffer amplifier constituted of the operation amplifier 1001 is connected to one input of the operation amplifier 1002 via the resistance element 1003) and the resistance element 1004 is connected between the input and output terminals of the second operation amplifier 1002. Another input terminal of the operation amplifier 1002 is connected to an output of the gain amplifier 503. Assuming that resistance values of the resistance elements 1003, 1004 are R5, R6, and a terminal voltage of another input terminal of the operation amplifier 1002 is Vref, then input/output characteristics at a time when a potential of the common output line 10 is Vin and a potential of an output terminal 1005 is Vout are as follows:

$$Vout=-(R6/R5)\cdot(Vin-Vref)+Vref.$$

It is to be noted that the gain Ga of the signal amplifier is −R6/R5.

Here, when the gain of the gain amplifier 503 of the reference voltage source is set to R6/(R5+R6), the similar advantages can be attained even in a case where the output amplifier is a reverse amplifier constituted of the operation amplifier and resistance element.

Sixth Embodiment

Figure 7:
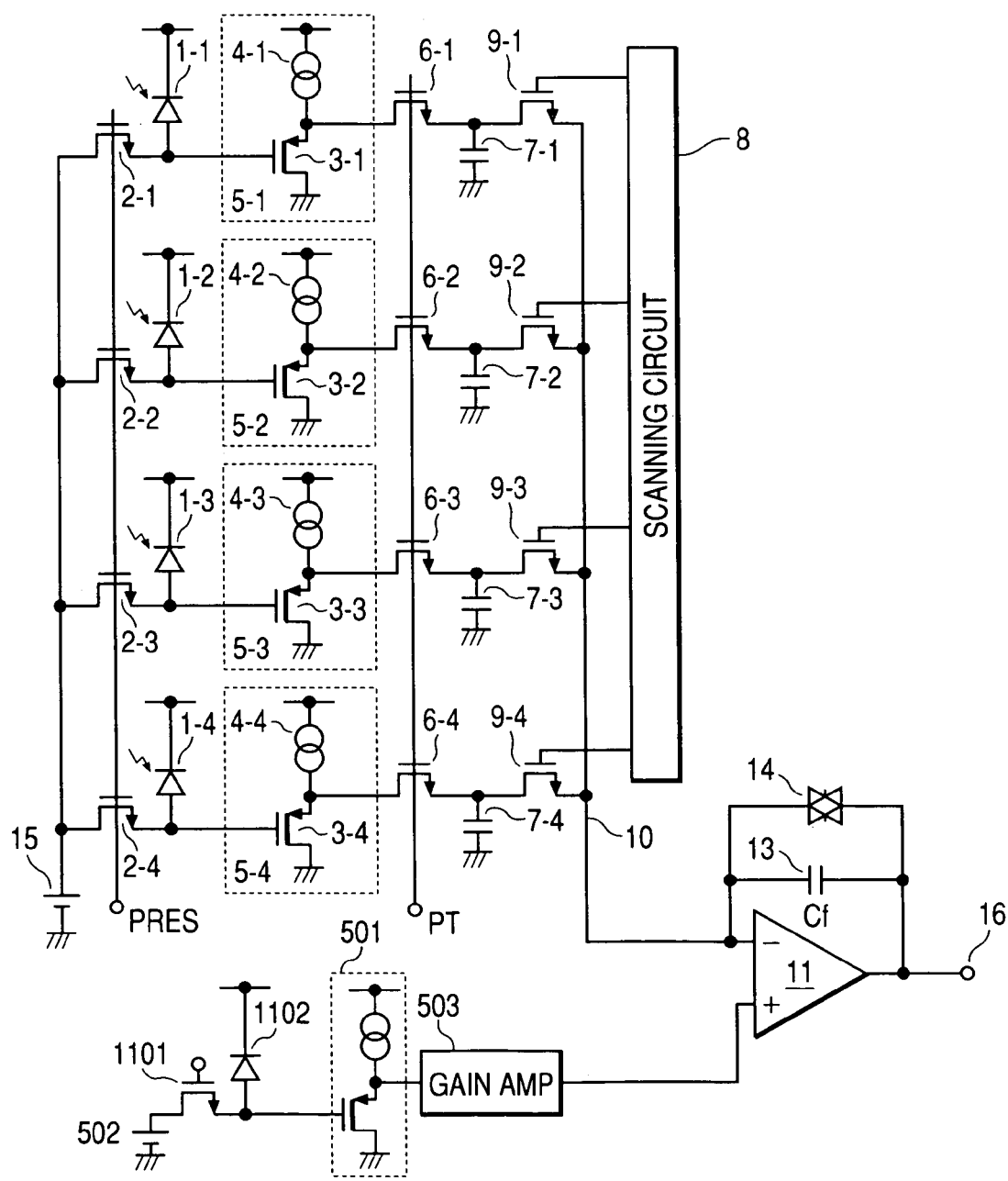
FIG. 7 is a circuit constitution diagram showing the solid-state imaging device according to a sixth embodiment of the present invention.

FIG. 7 is a schematic explanatory view showing a sixth embodiment of the present invention. The same members as those of FIGS. 13 and 1 are denoted with the same reference numerals. In FIG. 7, reference numeral 1101 denotes a second reset MOS transistor having a drain capacitance substantially equal to that of the reset MOS transistor 2, and 1102 denotes a second photoelectric conversion element similar to the photoelectric conversion element 1. As described above, when the reset MOS transistor 2 is turned on, one end of the photoelectric conversion element 1 is reset to a voltage determined by the reset power supply 15. However, in detail, a coupling capacitance (not shown) exists between a junction portion of the photoelectric conversion element 1 and source follower input MOS transistor 3, and the gate of the reset MOS transistor 2. The coupling capacitance is mainly caused by an overlap capacitance between the gate and drain of the reset MOS transistor 2. Therefore, when the reset MOS transistor 2 turns off, the potential variation is generated in the connected portion by deflection caused by the coupling capacitance. The potential variation changes with a ratio of the coupling capacitance to the capacitance existing in the junction point, and amplitude of the reset pulse PRES.

Therefore, in the present embodiment, the second reset MOS transistor 1101 having a drain junction capacitance substantially equal to that of the reset MOS transistor 2 and an overlap capacitance between the gate and drain, and the photoelectric conversion element 1102 having a junction capacitance substantially equal to that of the photoelectric conversion element 1 are also disposed between the second reference voltage source 502 and the source follower circuit 501 in the reference electric power supply circuit section. Accordingly, the reference voltage can be adjusted more correctly. It is preferable that photoelectric conversion element 1102 is sufficiently shielded by shielding means.

FIG. 7 shows an example in which both the second reset MOS transistor 1101 and the photoelectric conversion element 1102 are disposed. In case that the capacitance produced by the photoelectric conversion element 1102 is small with respect to the whole capacitance, the photoelectric conversion element 1102 may also be omitted.

Any timing before reading the signal into the input terminal of the operation amplifier 11 may be used as a timing to open/close the second reset transistor. In the present embodiment, the second reset transistor is preferably opened/closed a little before the horizontal scanning circuit 8 operates.

Seventh Embodiment

Figure 8:
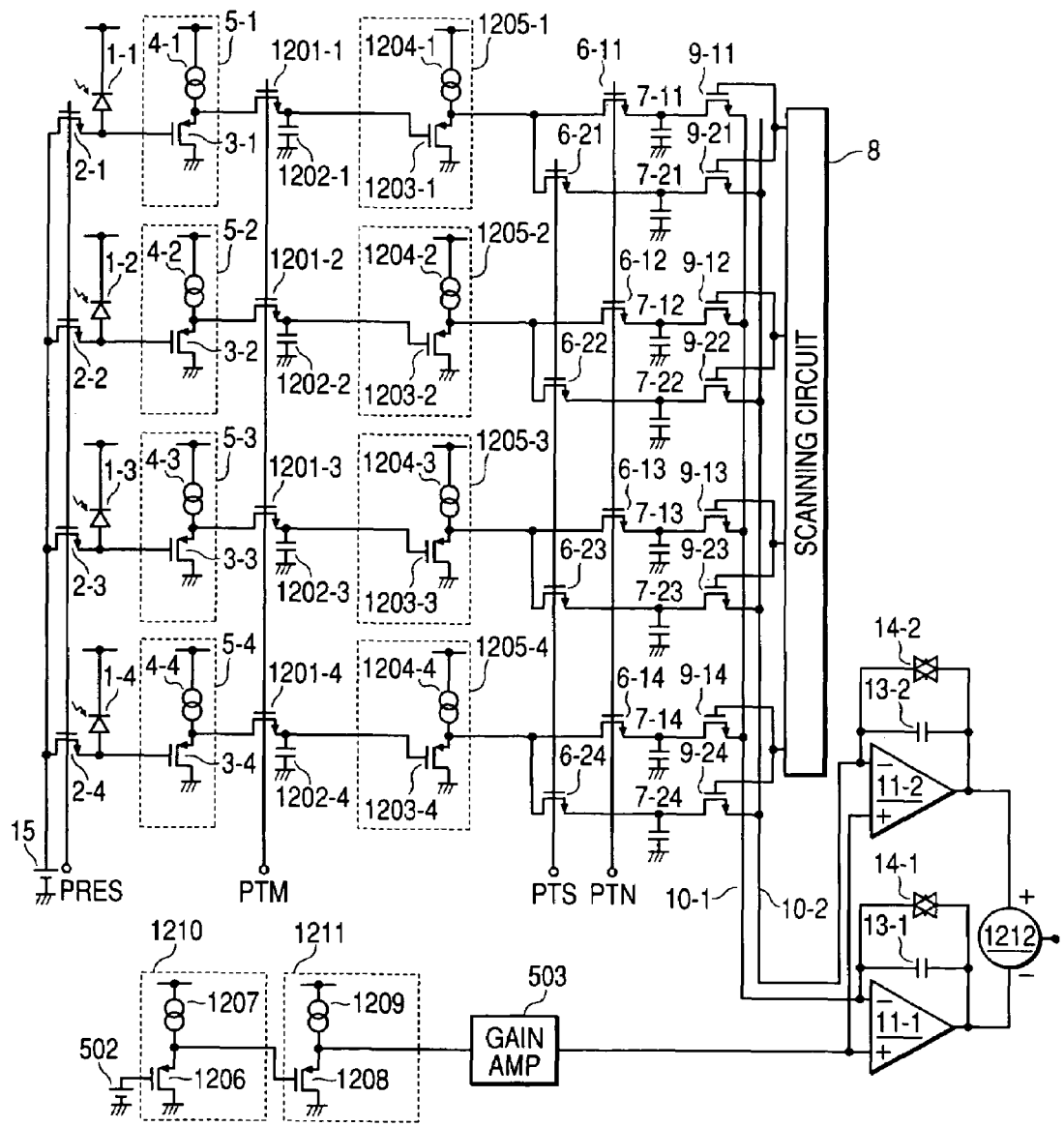
FIG. 8 is a circuit constitution diagram showing the solid-state imaging device according to a seventh embodiment of the present invention.

FIG. 8 is a schematic explanatory view showing a seventh embodiment of the present invention. The same members as those of FIGS. 13 and 1 are denoted with the same reference numerals. In FIG. 8, reference numeral 1201 (1201-1 to 1201-4) denotes transfer MOS transistors into a second holding capacitor, 1202 (1202-1 to 1202-4) denotes second holding capacitors, 1203 (1203-1 to 1203-4), 1206, 1208 denote input MOS transistors of the source followers, 1204 (1204-1 to 1204-4), and 1207, 1209 are constant current sources of the source followers. The input MOS transistor 1203 and the constant current source 1204 are combined to form a second source follower amplifier 1205 (1205-1 to 1205-4). The input MOS transistor 1206 and the constant current source 1207 are combined to form a third source follower amplifier 1210. The input MOS transistor 1208 and the constant current source 1209 are combined to form a fourth source follower amplifier 1211. Reference numerals 6-11 to 6-14 denote transfer transistors for transferring signals at the dark time to the holding capacitors 7-11 to 7-14, and 6-21 to 6-24 denote transfer transistors for transferring light signals to holding capacitors 7-21 to 7-24. Reference numeral 1212 denotes a differential amplifier, 503 denotes a gain amplifier, 10-1, 10-2 denote common output lines, 11-1, 11-2 denote operation amplifiers, 13-1, 13-2 denote feedback capacitors of amplifiers, and 14-1, 14-2 denote switches.

Figure 9:
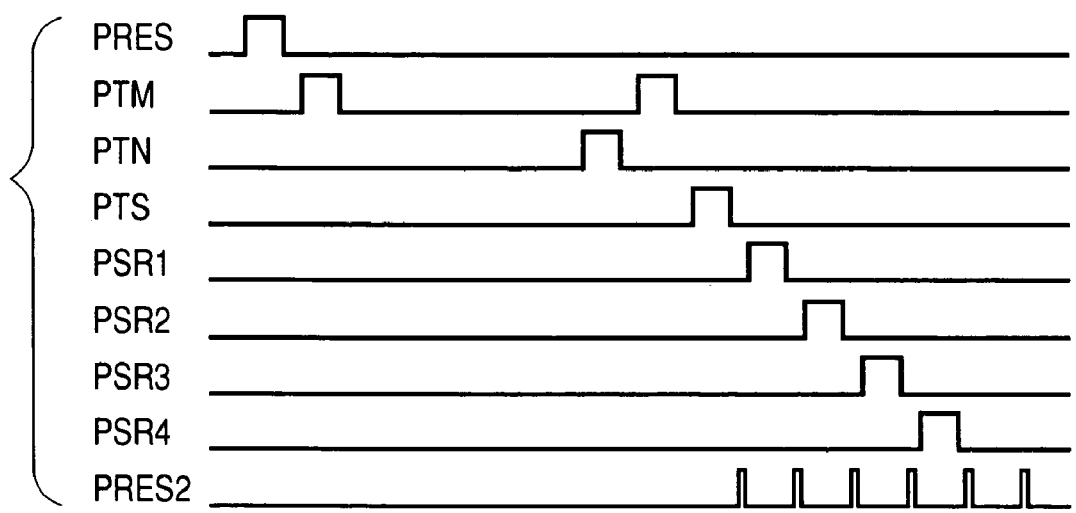
FIG. 9 is a timing chart of the solid-state imaging device of FIG. 8.

An operation timing chart of the present embodiment is shown in FIG. 9. In the drawing, PRES denotes a reset pulse which is input into the reset MOS transistor 2, PTM denotes a transfer pulse to be input into the transfer MOS transistor 1201, PTN denotes transfer pulses to be input into the transfer MOS transistors 6-11 to 6-14, and PTS denotes transfer pulses to be input into the transfer MOS transistors 6-21 to 6-24.

First, the reset MOS transistor 2 is turned on by the reset pulse PRESto reset the photoelectric conversion element 1 to a desired reset voltage. Next, the transfer MOS transistor 1201 is turned on by the transfer pulse PTM, and the voltage at the dark time just after the resetting is amplified by the source follower amplifier 5 and written into the second holding capacitor 1202. Thereafter, the photoelectric conversion element 1 enters the accumulation operation of the light signal to produce an electric charge in accordance with the quantity of irradiated light. The generated electric charge is converted to the voltage by the capacitor existing in a junction portion (not shown) of the photoelectric conversion element 1 and input MOS transistor 3. Therefore, the terminal voltage of the photoelectric conversion element 1 changes in accordance with the quantity of received light.

After the elapse of the accumulation time, the transfer MOS transistors 6-11 to 6-14 are turned on by the transfer pulse PTN, and the voltage at the dark time just after the resetting is amplified by the second source follower circuit 1205 in accordance with the voltage on the second holding capacitor 1202 and output to the holding capacitors 7-11 to 7-14. Next, the transfer MOS transistor 1201 is turned on by the transfer pulse PTM again, and the terminal voltage of the photoelectric conversion element 1 which has changed in accordance with the quantity of received light is amplified by the source follower amplifier 5 and read out into the holding capacitor 1202. Subsequently, the transfer MOS transistors 6-21 and 6-22 are turned on by the transfer pulse PTS, and this light signal voltage is amplified by the second source follower circuit 1205 in accordance with the voltage on the second holding capacitor 1202 and read out into the holding capacitors 7-21 to 7-24. Next, the pulse PRES2 is turned on to bring the operation amplifiers 11-1, 11-2 into buffer states. When the amplifiers are brought into the buffer states, the common output lines 10-1, 10-2 are reset to Vref1. Next, when the second signal transfer transistor 9-1 is turned on by the scanning pulse PSR1, the signal charges stored in the holding capacitors 7-11, 7-21 are read into the common output lines 10-1, 10-2. As described in the related art, the operation amplifiers 11-1, 11-2 output signals in accordance with the read signal charges, and the differential amplifier 1212 takes and outputs a difference between two signals. Subsequently, the scanning pulses PSR2 to PSR4 are successively turned on to continuously read out the signal.

In general, when the photoelectric conversion element such as the photodiode is reset, a reset noise is generated by a quantal fluctuation of a potential after the resetting. By arranging the conventional circuit so as to include a circuit constitution which outputs the difference between the signal just after the resetting and the signal superimposed upon the signal by the light, a signal having reduced reset noises and having a good S/N ratio is obtained.

Since the variation of the offset voltage is generated both in the source follower circuit 5 and the second source follower circuit 1205 in the present embodiment, it is advantageous to change the reference voltage of the reference voltage source 12 in accordance with the change amounts of both the circuits. To this end, the third source follower 1210 and the fourth source follower 1211 are disposed, and the signal obtained by applying a desired gain to the produced voltage in the gain amplifier 503 is used as the reference voltage of the operation amplifier 11. Accordingly, the potential variation in the amplifier output is eliminated.

In the present embodiment, the reference electric power supply circuit formed by the source follower circuit of the constant current load type has been described, but the embodiment is not limited to this circuit, and, needless to say, the similar technological advantages can be attained even with the configuration using the source follower circuit of a resistance load type or MOS resistance load type. Needless to say, the similar advantages can be also attained even with the configuration using the operation amplifier 11.

Moreover, in the present embodiment, the reference voltage source section is provided with the third source follower 1210 and the fourth source follower 1211, but the embodiment is not limited to this configuration. For example, in general, the variations of the threshold voltages of the MOS transistors of the same conductive type indicate the same tendency. Therefore, in case that the source follower circuit 5 and the second source follower circuit 1205 are constituted of the MOS transistors of the same conductive type, a set of source follower circuits of the same conductive type are used as references so that the output is multiplied by a predetermined gain, thereby attaining the similar technological advantages.

Eighth Embodiment

Figure 10:
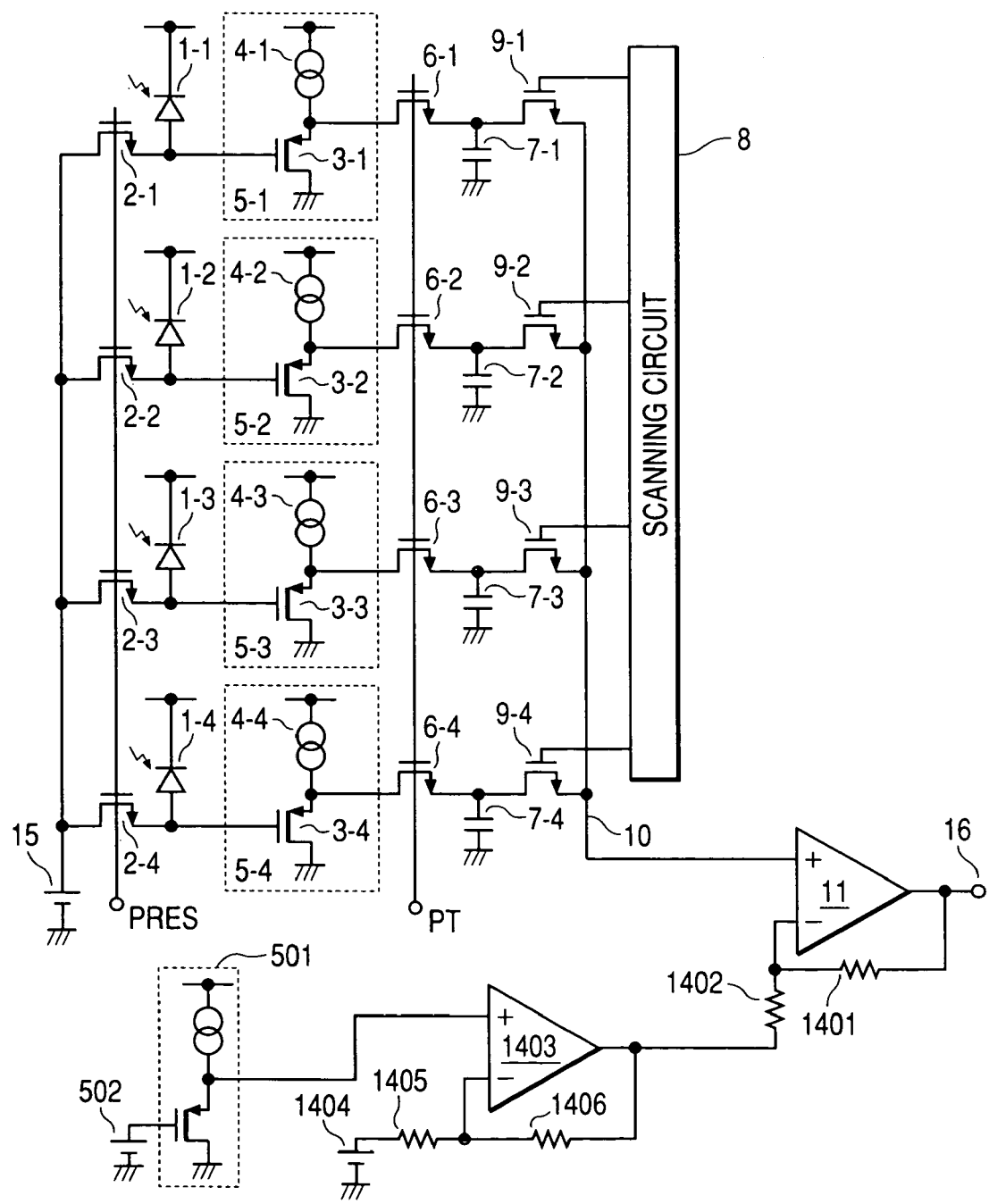
FIG. 10 is a circuit constitution diagram showing the solid-state imaging device according to an eighth embodiment of the present invention.

FIG. 10 is a schematic explanatory view showing an eighth embodiment of the present invention. The same members as those of FIGS. 13 and 1 are denoted with the same reference numerals. In FIG. 10, reference numerals 1401, 1402, 1405, 1406 denote resistance elements, 1403 denotes a second operation amplifier, and 1404 denotes a second reference voltage source. The operation amplifier 11 and the resistance elements 1401, 1402 constitute a first forward amplifier. The operation amplifier 1403 and the resistance elements 1405, 1406 constitute a second forward amplifier. A forward input of the first forward amplifier is connected to the common output line 10, and a reverse input is connected to the output of the second forward amplifier via the resistance element 1402. The forward input of the second forward amplifier is connected to the output of the second source follower circuit 501, and the reverse input is connected to the third reference electric power supply 1404 via the resistance element 1405. Assuming that the resistance values of the resistance elements 1401, 1402, 1405, 1406 are R1 to R4 respectively, the input/output characteristics of the first forward amplifier are as follows:

$$Vout = ((R1+R2)/R2)Vin - (R1/R2)Vref,$$

where Vref denotes an output voltage of the second forward amplifier.

Moreover, the input/output characteristics of the second forward amplifier are as follows:

$$Vref = ((R3+R4)/R4)Vin2 - (R3/R4)Vref2,$$

where Vin2 denotes an output voltage of the second source follower circuit 501, and Vref2 denotes a reference voltage of the second reference electric power supply 1404. The above equation is organized as follows.

$$Vout = \frac{R1+R2}{R2}Vin - \frac{R1}{R2}\left(\frac{R3+R4}{R4}Vin2 - \frac{R3}{R4}Vref2\right) \quad (4)$$

In the same manner as the above-described embodiments, in case that the transistor size of the second source follower circuit 501 is selected to satisfy:

$$Vin \approx Vin2 \quad (5),$$

the above equation (5) is differentiated, and then resistance values R1 to R4 that satisfy the following equation may be selected to suppress the variation of Vout even with the variation of Vin.

$$\frac{dVout}{dVin} \approx \frac{R1+R2}{R2} - \frac{R1}{R2}\frac{R3+R4}{R4} \approx 0 \quad (6)$$

$$\frac{R3+R4}{R4} = \frac{R1+R2}{R1}$$

In this manner, the similar advantages can be attained even in the forward amplifier. In the present embodiment, the reference voltage source is also described, for example, as the forward amplifier which uses the operation amplifier, but the present invention is not limited to the embodiment. The signal obtained by applying the gain which satisfies the above equation to the output of the second source follower circuit 501 having an offset variation substantially equal to that of the first source follower circuit 5 via the MOS reverse amplifier may be used as the reference voltage of the first forward amplifier. Accordingly, the similar advantages can be attained with a circuit having a smaller scale.

Ninth Embodiment

Figure 11:
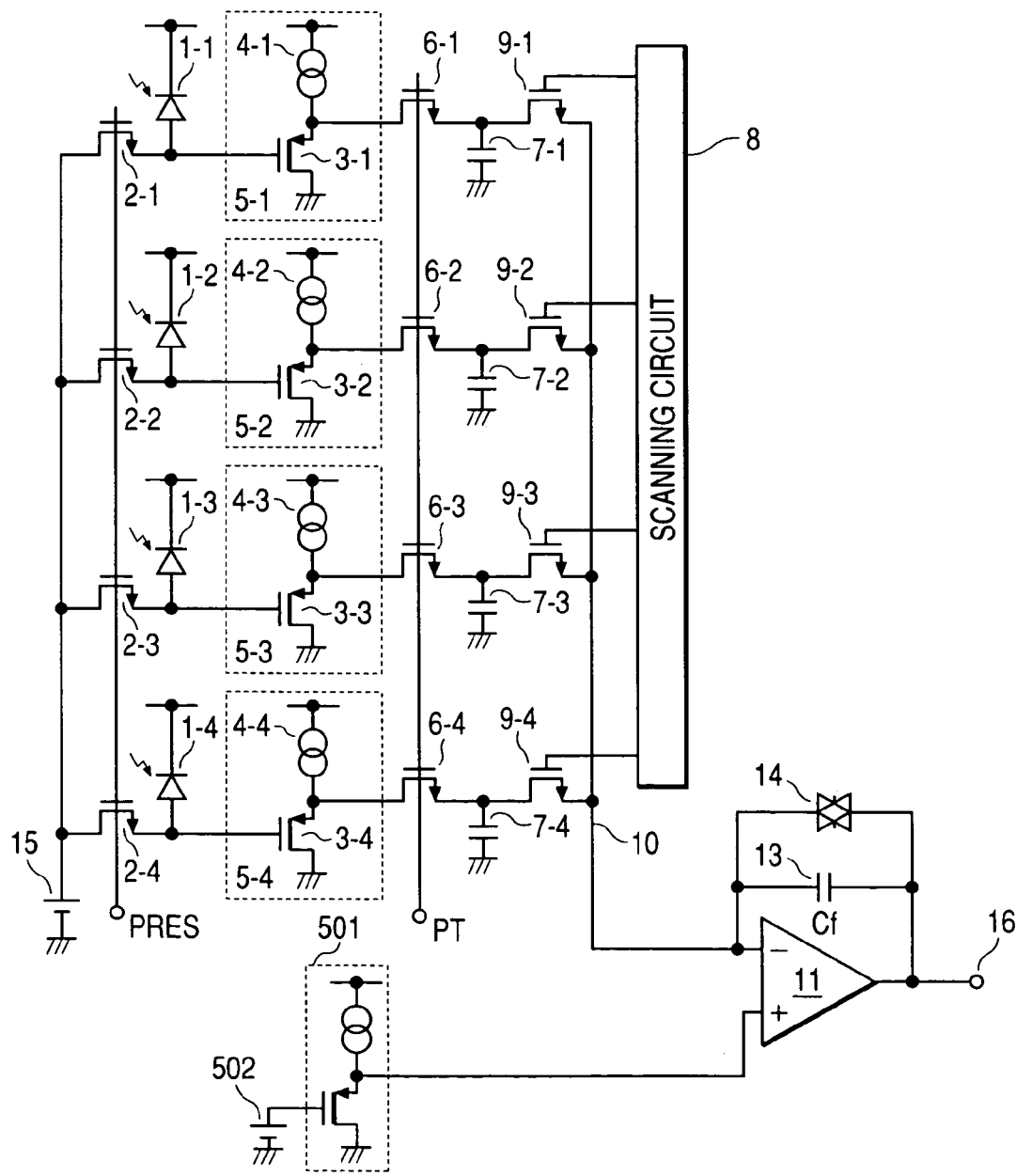
FIG. 11, is a circuit constitution diagram showing the solid-state imaging device according to a ninth embodiment of the present invention.

FIG. 11 is a schematic explanatory view showing a ninth embodiment of the present invention. The same members as those of FIGS. 13 and 1 are denoted with the same reference numerals. In the present embodiment, an output of the source follower circuit 501 is directly obtained as the reference voltage of the operation amplifier 11 without using the gain amplifier 503 of the first embodiment. The input/output characteristics of the output amplifier of the conventional circuit shown in FIG. 13 are represented again by the following equation:

$$V\text{out} = -(Ct/Cf) \cdot (V\text{in} - V\text{ref1}) + V\text{ref1}.$$

When the reference voltage Vref1 indicates a constant value, the variation of Vout to that of Vin is as follows:

$$\frac{dV\text{out}}{dV\text{in}} = -\frac{Ct}{Cf} \tag{7}$$

The variation amounts of Vin and Vref1 to the manufacturing process variation are selected so as to be substantially equal to each other as in the present embodiment, thereby obtaining the following equation:

$$\frac{dV\text{out}}{dV\text{in}} = \tag{8}$$
$$-\frac{Ct}{Cf}\left(\frac{dV\text{in}}{dV\text{in}} - \frac{dV\text{ref1}}{dV\text{in}}\right) + \frac{dV\text{ref1}}{dV\text{in}} = -\frac{Ct}{Cf}(1-1) + 1 = 1$$

In case that the gain (=–Ct/Cf) of the output amplifier with respect to the original signal is larger than 1, the output voltage variation of the output amplifier by the variation of the voltage at the dark time can be reduced even with the use of a simple circuit as in the present embodiment. Problems that the signal linearity is deteriorated and that the saturation voltage drops can be effectively solved.

Tenth Embodiment

Figure 12:
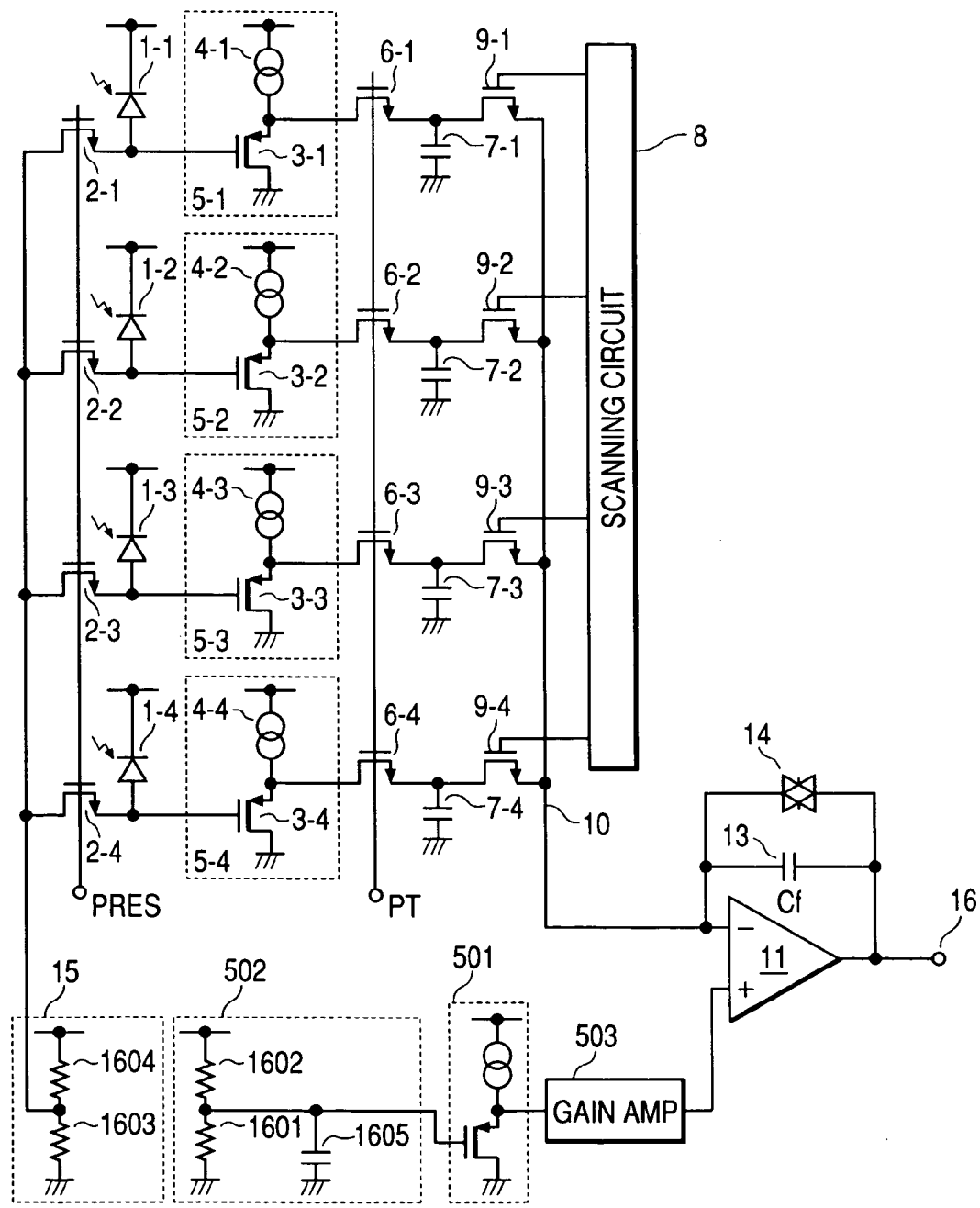
FIG. 12 is a circuit constitution diagram showing the solid-state imaging device according to a tenth embodiment of the present invention.

FIG. 12 is a schematic explanatory view showing a tenth embodiment of the present invention. The same members as those of FIGS. 13 and 1 are denoted with the same reference numerals. In the drawing, reference numerals 1601 to 1604 denote resistance elements, and 1605 denotes a capacitor element. The power voltage is resistance-divided by the resistance elements 1603 and 1604 to constitute a reset voltage source 15. The power voltage is resistance-divided by the resistance elements 1601 and 1602 to constitute the second reference voltage source 502 of the second source follower circuit 501. When the reset voltage source 15 is constituted by the resistance division, a reset voltage of the photoelectric conversion element varies depending on the variation of the power voltage, and the voltage variation at the dark time is effectively generated on the holding capacitor Ct in the same manner as in the above-described conventional device. However, the second reference voltage source 502 is also constituted to change together with the variation of the power voltage in this manner, the signal obtained by applying a predetermined gain to the voltage according to the present embodiment is obtained as the reference voltage of the output amplifier, thereby attaining the similar technological advantages even with respect to the variation of the power voltage.

Moreover, when the capacitor element 1605 is connected to limit a frequency band of the connected point as shown in the FIG. 12, a solid-state imaging device can be realized whose random noise generated in the second reference voltage source is reduced and which has a better S/N ratio.

In the above-described embodiments, the PMOS type source follower circuit is described, but the present invention is not limited to the embodiments. The similar technological advantages can also be obtained even in case of an NMOS type source follower circuit. In the present embodiment, the source follower circuit of the constant current load type is described, but the present invention is not limited to those embodiments, and, needless to say, the present invention is advantageous even in case of a source follower circuit of a resistance load type. In the above-described embodiments, a four-pixel linear sensor is described as an example. But, needless to say, the similar technological advantages are obtained regardless of the number of pixels, pixel arrangement pattern or the like of the sensor.

Further in the above-described embodiments, the photodiode in which the anode is connected to the input MOS transistor of the source follower is described as the example. But the present invention is not limited to those embodiments, and, needless to say, the similar technological advantages can be attained even with the use of a photodiode connected to a cathode, or a photo-transistor.

Moreover, in the above-described embodiments, the circuit configuration in which the reset MOS transistor is directly connected to the photoelectric conversion element is described as an example, but the present invention is not limited to this example. Needless to say, the technological advantages of the present invention are not impaired even in case of the photoelectric conversion element including a circuit configuration in which a transfer switch is disposed between a photodiode of a complete depletion type and a floating diffusion section and a reset transistor is disposed in the floating diffusion section.

Furthermore, in the above-described embodiments, the case where the signal accumulation operation and the signal reading operation of the holding capacitor are successively performed is described as an example with reference to the operation timing chart, but the present invention is not limited to this example. Even when the signal is read out from the holding capacitor, this operation is possible at an accumulation timing. Needless to say, the technological advantages of the present invention are similarly attained even in this case.

Moreover, the output amplifier is sometimes used by switching the gain. Even in this case, the gain of the reference voltage source is also switched according to the present invention, and, needless to say, the similar technological advantages are accordingly attained.

Furthermore, the present invention is not limited to the above-described embodiments, and can variously be modified and carried out within the scope of the present invention. The configurations described in each of the embodiments may also be combined (e.g., the configuration of FIG. 8 may be combined with that of the other embodiment, for example, shown in FIG. 7).

Many widely different embodiments of the present invention may be constructed without departing from the spirit and scope of the present invention. It should be understood that the present invention is not limited to the specific embodiments described in the specification, except as defined in the appended claims.

What is claimed is:

1. A solid-state imaging device comprising:
a plurality of pixels each including a photoelectric conversion element and a signal amplification element which receives a signal from the photoelectric conversion element to amplify and output the signal;
a signal amplifier including a first input terminal which receives the signal from the signal amplification element and a second input terminal into which a reference voltage is input; and
a reference electric power supply, which supplies the reference voltage to the second input terminal of the signal amplifier,
wherein the reference electric power supply includes a circuit configuration equivalent to the signal amplification element.

2. A solid-state imaging device comprising:
a plurality of pixels each including a photoelectric conversion element and a first source follower amplifier whose input terminal is connected to one end of the photoelectric conversion element;
a signal amplifier including an input terminal which receives the signal output from the first source follower amplifier and a second input terminal into which a reference voltage is input; and
a reference electric power supply, which supplies the reference voltage to the second input terminal of the signal amplifier,
wherein the first source follower amplifier includes a conductive type input transistor and a load element, and
wherein the reference electric power supply includes a second source follower amplifier including an input transistor of the same conductive type as that of the first source follower amplifier and a load element.

3. A solid-state imaging device comprising:
a photoelectric conversion element;
a first source follower amplifier whose input terminal is connected to one end of the photoelectric conversion element;
a first holding capacitor, which receives a signal output from the first source follower amplifier via a first transfer transistor;
a second source follower amplifier whose input terminal is connected to the first holding capacitor;
a second holding capacitor, which receives a signal output from the second source follower amplifier via a second transfer transistor;
a third holding capacitor, which receives a signal output from the second source follower amplifier via a third transfer transistor;
a first signal amplifier including a first input terminal which receives the signal held by the second holding capacitor and a second input terminal into which a reference voltage is input;
a second signal amplifier including a third input terminal which receives the signal held by the third holding capacitor and a fourth input terminal into which a reference voltage is input; and
a reference electric power supply connected to the second and fourth input terminals of the first and second signal amplifiers,
wherein at least one of the first and second source follower amplifiers includes a conductive type input transistor and a load element, and
wherein the reference electric power supply includes a third source follower amplifier including an input transistor of the same conductive type as that of at least one of the first and second source follower amplifiers and a load element.

4. The solid-state imaging device according to claim 2, wherein the reference electric power supply includes a gain amplifier, which receives an output of the second source follower amplifier as an input, and the output of the gain amplifier is connected to the second input terminal of the signal amplifier.

5. The solid-state imaging device according to claim 3, wherein the reference electric power supply includes a gain amplifier, which receives an output of the third source follower amplifier as an input, and the output of the gain amplifier is connected to the second and fourth input terminals of the first and second signal amplifiers.

6. The solid-state imaging device according to claim 2, wherein load means of the second source follower amplifier includes a constant current load, a resistance element, or a MOS type transistor.

7. The solid-state imaging device according to claim 3, wherein load means of the third source follower amplifier includes a constant current load, a resistance element, or a MOS type transistor.

8. The solid-state imaging device according to claim 2, wherein the input terminal of the second source follower amplifier is connected to a constant voltage source.

9. The solid-state imaging device according to claim 3, wherein the input terminal of the third source follower amplifier is connected to a constant voltage source.

10. The solid-state imaging device according to claim 4, wherein the gain amplifier includes an operation amplifier.

11. The solid-state imaging device according to claim 4, wherein assuming that a gain of the signal amplifier is Ga, a gain of the gain amplifier is substantially $Ga/(Ga-1)$.

12. The solid-state imaging device according to claim 1, wherein the signal amplifier includes an amplifier of a capacity feedback type or a resistance feedback type.

13. The solid-state imaging device according to claim 1, wherein the signal amplifier includes a reverse amplifier or a forward amplifier.

14. The solid-state imaging device according to claim 2, further comprising:
a first reset transistor, which resets the photoelectric conversion element;
a first reset electric power supply connected to one end of the photoelectric conversion element via the first reset transistor; and
a second reset electric power supply connected to the input terminal of the second source follower amplifier.

15. The solid-state imaging device according to claim 3, further comprising:
a first reset transistor, which resets the photoelectric conversion element;
a first reset electric power supply connected to one end of the photoelectric conversion element via the first reset transistor;
a second reset transistor of the same conductive type as that of the first reset transistor; and
a second reset electric power supply connected to the input terminal of the third source follower amplifier via the second reset transistor.

16. The solid-state imaging device according to claim 14 or 15, wherein an electric power voltage is divided by resistance to form both the first and second reset electric power supplies.

* * * * *

UNITED STATES PATENT AND TRADEMARK OFFICE
CERTIFICATE OF CORRECTION

| | | |
|---|---|---|
| PATENT NO. | : 7,135,668 B2 | Page 1 of 1 |
| APPLICATION NO. | : 10/887816 | |
| DATED | : November 14, 2006 | |
| INVENTOR(S) | : Tetsunobu Kochi et al. | |

It is certified that error appears in the above-identified patent and that said Letters Patent is hereby corrected as shown below:

COLUMN 5:

Line 9, "11,is" should read --11 is--.

Signed and Sealed this

Eighth Day of April, 2008

JON W. DUDAS
*Director of the United States Patent and Trademark Office*